United States Patent
Roussell et al.

(10) Patent No.: US 6,770,318 B1
(45) Date of Patent: Aug. 3, 2004

(54) FISH BASED FOOD PRODUCT AND PROCESS FOR MAKING

(75) Inventors: Laurence Roussell, Saint Arnould en Yvelines (FR); Veronique Parent, Carentan (FR); Guillaume Lenglin, Camprond (FR)

(73) Assignee: Neptune S.A., Viroflay Cedex (FR)

( * ) Notice: Subject to any disclaimer, the term of this patent is extended or adjusted under 35 U.S.C. 154(b) by 0 days.

(21) Appl. No.: 09/594,922

(22) Filed: Jun. 15, 2000

(30) Foreign Application Priority Data

Jun. 16, 1999 (FR) .......................................... 99 07625

(51) Int. Cl.⁷ .............................................. A23L 1/325
(52) U.S. Cl. ........................ 426/643; 426/513; 426/516
(58) Field of Search ................................ 426/243, 510, 426/513, 516, 518, 643

(56) References Cited

U.S. PATENT DOCUMENTS

| | | |
|---|---|---|
| 3,863,017 A | 1/1975 | Yueh |
| 4,362,752 A | 12/1982 | Sugino et al. ............... 426/104 |
| 4,396,634 A | 8/1983 | Shenouda et al. ........... 426/104 |
| 4,584,204 A | 4/1986 | Nishimura et al. .......... 426/643 |
| 4,652,455 A | 3/1987 | Sugino et al. ............... 426/104 |
| 4,666,720 A | 5/1987 | Sasamoto et al. ........... 426/104 |
| 4,814,191 A | 3/1989 | Yasuno ........................ 426/104 |
| 4,937,089 A | 6/1990 | Ikoma et al. ................ 426/574 |
| 5,549,920 A | 8/1996 | Choudhury .................. 426/516 |

FOREIGN PATENT DOCUMENTS

| | | |
|---|---|---|
| EP | 0 398 315 | 11/1990 |
| EP | 0 404 214 | 12/1990 |
| GB | 1 518 778 | 7/1978 |

*Primary Examiner*—Arthur L. Corbin
(74) *Attorney, Agent, or Firm*—Harness, Dickey & Pierce, P.L.C.

(57) ABSTRACT

Fish based food product consisting of two materials, a paste material and a fibrous material, the paste material being aerated by texturization, incorporating fibers whose diameter is between 1 μm and 1 mm, either isolated or in bundles, the product having a heterogeneous texture and a firm and elastic overall consistency similar to that of fish or crustacean muscle. The fibrous material obtained by extrusion cooking forms a network of macroscopic fibers whose diameters are in the order of 0.1 mm to 1 mm, ramified into microscopic fibers with diameters in the order of 1 μm to 0.1 mm.

33 Claims, 4 Drawing Sheets

FISH BASED FOOD PRODUCT AND PROCESS FOR MAKING

BACKGROUND OF THE INVENTION

1. Field of the Invention

The invention concerns a fish-based multitextured food product, a multitextured food preparation, a process for obtaining these products and a manufacturing installation for application of the process.

2. Brief Description of Related Developments

Products based on surimi and obtained after forming and cooking, such as imitation lobster tails, shrimps and crab claws, already exist.

These imitation products which resemble marine products in terms of size and shape are generally fairly large and weigh over 20 g. The manufacturing processes they undergo give them an authentic shape but not a great deal of texture.

These products have a homogeneous texture as a result of combining surimi flakes that is rather crunchy or grainy.

Moreover, various processes also exist by means of which these products are obtained, such as scarified and rolled bars, flakes produced by slicing said bars, seafood meats obtained by stacking successive layers.

These products are obtained by scarification of a strip of gelled surimi then processing this strip. The products may have a pseudo-fibrous macrostructure, as a result of shredding the strips to be made to resemble crab meat as much as possible.

This pseudo-fibrous texture cannot be regarded as being truly fibrous in the same way as natural fish or crustacean muscle.

These processes are not well adapted the production of forms other than conventional forms (bars, flakes, slices).

There are also processes in existence for the production of imitation shrimp tails by moulding a mixture of fairly large fibres and a fish paste.

Document U.S. Pat. No. 4,362,752 describes such a process in which fibres have a diameter of under 0.5 mm.

Document U.S. Pat. No. 396,634 describes such a process using fibres with diameters in the range of 0.5 to 5 mm, preferably between 1 and 3 mm.

Document U.S. Pat. No. 584,204 describes such a process using a mixture of gelled fish fibres with diameters in the range of 1 to 4 mm, preferably between 0.3 and 3 mm.

Each of these documents uses fibres within a range of specific sizes to obtain the desired type of structure, to imitate or artificially recreate the meat of crustaceans or molluscs.

SUMMARY OF THE INVENTION

The invention concerns the production, by mixing a fibrous material and a paste material, of products with varying textures, called multitextured, which resemble the texture of natural fish and crustacean muscle without totally substituting for the texture and shape of the original products.

Further, the invention is aimed at obtaining, from a given formula, a wide range of textures in multitextured products, both in terms of the size of incorporated fibres and wide range of paste material textures.

The invention is also aimed at obtaining specific and original forms of the finished product, in the order of 3 to 150 g, especially small forms weighing under 20 grams.

To this end, a first aspect of the invention concerns a fish based food product comprising two materials, a paste material and a fibrous material, the paste material being aerated by texturization, incorporating individual fibres or bundles of fibres with a diameter in the range of 1 $\mu$m to 1 mm, the product presenting a heterogeneous texture and a firm and elastic overall consistency similar to that of fish or crustacean muscle tissue.

According to one embodiment, the fibrous material, obtained by extrusion cooking forms a network of macroscopic fibres whose diameters are in the order of 0.1 mm to 1 mm, ramified into microscopic fibres with diameters in the order of 1 $\mu$m to 0.1 mm.

According to other embodiments, the fibrous material comprises of small fibres with a diameter of 0.1 mm to 1 mm, obtained by size reduction of a fish based preparation, or originating from natural fibres of seafood products resulting from mechanical separation of myotomes.

The product contains over 30% of marine ingredients, in particular between 30 and 60% of marine ingredients, mainly fish meat, and 25 to 40% water, in two or three-dimensional shapes such as thin strips, cylinders, fish pates or other shapes, to which colouring is added in some cases.

The shapes are typically 1 to 12 cm in length and weigh between 3 and 300 g, typically 3 to 20 g.

According to a second aspect, the invention concerns a fish based food preparation incorporating a product comprising of a fibrous material as presented above and a paste material consisting of over 30% of fish meat, the preparation being in the form of fish steaks, fish and vegetable based cakes, filled bars, quiches, thin slices, spreads, fish rillettes, small ludic shapes.

According to a third aspect, the invention concerns a process for the production of above-described heterogeneous texture products, a process comprising the following steps:

manufacture of fibrous material and paste material;
mixing the fibrous material with the paste material;
moulding the mixture to form shapes.

The paste material is textured, usually by addition of air, using homogenisation, emulsification and/or expansion and/or cutting type processes, either before mixing with the fibrous material, at a rate of 0.5 part to 1 part air per 1 part of paste material, in order to obtain a gelling strength in the order of 50 to 150 g/cm$^2$, or after mixing with the fibrous material by adding between 0.3 and 1 part air per mixture part.

According to a first embodiment, the fibrous material consists of a ramified network of fibres obtained from minced fish meat by means of a high-temperature and high-moisture extrusion cooking process comprising of the following steps:

a) introduction of fish meat into a single screw extruder;
b) transfer of fish meat from one end to the other of the extruder barrel, adjusting the screw(s) and temperature within the barrel such that raw materials successively undergo a mixing and heating step up to a temperature of about 130° C., followed by a melting step with an increase in temperature of the material to above 130° C., generally between 140° C. and 200° C., and an increase in pressure to between 0 and 50 bars, such that plasticization of the transferred material takes place;
c) extrusion at the far end of the barrel of the material obtained after plasticization through a die adapted for texturization, shaping and cooling the material such that a product with a ramified fibrous structure is obtained.

The extruded material is cooled in the die to a temperature of 100° C., possibly even between 80° C. and 30° C. This consists of an initial cooling phase in an uncooled zone in the die at the outlet of the barrel, followed by a second cooling phase in a cooled zone of the die.

The material obtained at the die outlet is cooled in a cold shower, sliced to the desired length then ground, with the extruded fibres cut by shredding, mincing, lamination, blending, homogenisation and separation such that they can be dispersed in a fish based matrix.

The extruded mixture contains between 15 and 50% of dry matter, notably 25 to 40%. The dry matter of the product consists of at least 35% of total proteins. 25 to 100% of dry matter in the extruded mixture consists of dry matter originating from fish and/or other marine products, essentially comprised of marine proteins in the form fibres of surimi extract pulp, etc. and, in some cases, other marine extracts such as fish oil, fish bone powder, crustacean shell powder, chitosane, fish collagen.

According to one embodiment, in addition to dry matter originating from fish, the dry matter in the extruded mixture contains functional milk proteins, such as whey proteins, caseins and/or caseinates, the functional milk proteins being in a dried or concentrated form.

According to one embodiment, the extruded mixture also contains egg proteins in liquid or powder form, vegetable or dairy fats, concentrated or isolated vegetable proteins, vegetable flour, starches and other complex carbohydrates, food grade hydrocolloids, spices, flavouring and colouring.

The extruded fibres are used in fresh form or preserved by physical treatment such as freezing, pasteurization or sterilisation.

According to a second embodiment, the fibrous material consists of small fibres obtained from a fish based preparation according to the following steps:

mixing the ingredients of the fish based preparation;

forming the fish based preparation;

moulding and cooking the fish based preparation to allow gelling to take place; cooling;

size reduction of the fish based preparation such as cutting or grating.

The fish based preparation used in the manufacture of small fibres comprises of over 50% washed and refined fish meat suitable for gelling, to which cryoprotectant type stabilising agents are added for freezing purposes, and a moisture content below 80%, the fish based preparation possibly enriched with gelling or thickening agents so as to obtain a gel strength of 150 to 300 g/cm$^2$.

According to a third embodiment, the fibrous material contains cooked or raw natural fibres from crab or other marine products, obtained by mechanical separation treatment, usually using a mixer with a rotary cylinder and comb.

Prior to texturization, the paste material used in the mixture:

contains over 30% washed and refined fish meat suitable for gelling, to which cryoprotectant type stabilising agents are added for freezing purposes, and a moisture content below 80%;

and in some cases enriched with gelling or thickening agents so as to obtain a gel strength of 100 to 250 g/cm$^2$ prior to texturization.

The level of incorporation of fibrous materials in the paste material is between 5 and 60% by weight, depending on the desired final texture, usually between 10 and 60% or 5 and 30%.

Mixing takes place at a temperature in the range of −10° C. and +20° C., typically between −2° C. and +6° C.

The fibres can be the same colour as the paste material or a different colour.

The fibres are incorporated according to a statistical method, in a blender or mixing tank, or according to a dynamic method, notably in an on-line mixer.

The fibrous material mixed with the paste material consists of two types of fibres chosen from the group comprised of ramified network fibres, small fibres, natural fibres.

The melting characteristics of the textured paste material is regulated as a function of the level of fats between 0 and 50%.

The paste obtained by mixing the fibres and paste material undergoes the following steps:

forming by extrusion or moulding into two- or three-dimensional shapes or into a strip;

cooking, leading to gelling and stabilisation of the product;

cooling.

Surface colour may or may not be added to the forms obtained, either to raw forms and/or after the cooking step by spraying, depositing colour on the strip or extrusion of a coloured paste material.

According to one embodiment, the cooking step consists of a combination of a microwave cooking step and steam cooking step. Microwave cooking essentially provides rapid cooking to the core of the product so as to produce a sufficiently stable gel-like structure that is stable before cooling while steam cooking leads to the surface of the product being cooked without drying it out. Microwave cooking is carried out before or simultaneously to steam cooking.

According to a fourth aspect, the invention concerns a manufacturing installation consisting of means for the manufacture of fibrous material, means for the manufacture of paste material and means for mixture shaping.

The means for manufacturing fibrous material comprise, in the case of a first embodiment, a screw extruder with two very similar interlocking screws which rotate in the same direction or in the opposite direction inside a horizontal barrel, a filling device attached at the near end of the barrel, fitted with at least one metering device for metered flow of the mixture at a predetermined rate, an extrusion die located at the far end of said barrel, thermal treatment assembly for fine-tuning the temperature within the barrel and extrusion die, said barrel being comprising:

a first zone for supply of the product formula;

a second zone for mixing, moisturisation where this is required, and heating the material up to a core temperature of at least 130° C.;

at least a third zone for melting, increasing the temperature of the material to over 130° C., generally between 140 and 200° C. and pressure of the material to between 0 and 50 bars, depending on the composition of the formula, in which protein plasticization takes place, especially of fish proteins.

The second mixing and heating zone consists of 2 to 5 units, the third melting zone comprises 1 to 3 units, with a screw length to screw diameter ratio of about 10 to 33, typically between 25 and 33.

The extrusion die includes a first uncooled zone adjacent to the near end of the screw extruder, followed by at least one cooling zone, corresponding to an alignment zone of the melted and plasticized material in the viscous state and a change-of-phase zone from the viscous to solid state.

The die is connected to the barrel by means of at least one, and typically two, adapters. The first adapter has one or two perforations through which the melted and plasticized material is extruded; the second adapter is located between the first adapter and the extrusion die and its function is to balance materiel pressure and flow rate.

The extrusion die has an internal shape that is adapted to the final product, with size parameters designed to allow cooling of the melted and plasticized material to 100° C., possibly between 80 and 10° C. Its inner surface has a controlled roughness in order to exert shear forces on the product during the cooling process, the combination of cooling and shear forces leading to continuous texturization of the cooled material to form fibres.

BRIEF DESCRIPTION OF THE DRAWINGS

Other facets and advantages of the invention will become apparent in the course of the description which follows, with reference to the drawings in which:

FIGS. 6a and 6b represent fibres arranged in V-shaped bundles obtained at the outlet of the extruder, diagrams 6c and 6d present manually or mechanically separated fibres;

DETAILED DESCRIPTION OF THE PREFERRED EMBODIMENT(S)

A description of the process and installation for the manufacture of fibres for mixing with a paste material is given below.

According to a first embodiment, the fibres produced for addition to the mixture are manufactured by extrusion cooking in a highly moisturised medium at high temperature. These fibres have a ramified structure, which will be described in more detail below, and are interchangeably referred to in the text as ultrafibres or ramified network fibres obtained by extrusion cooking.

Figure 4:
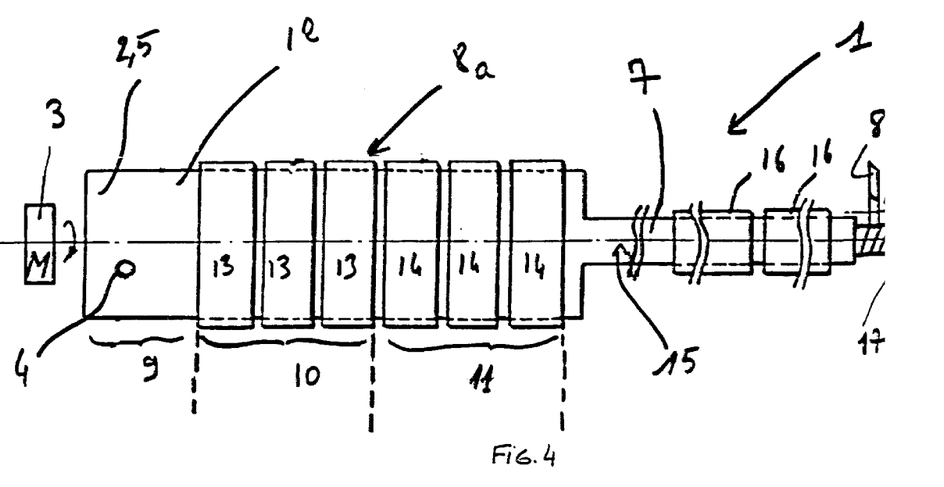
FIG. 4 is an illustration of an extrusion cooking installation for the production of ultrafibres.
Figure 5A:
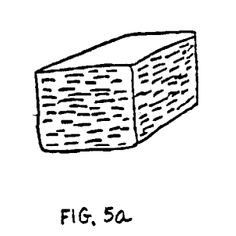
FIGS. 5a to 5i are an illustration of products obtained after mixing the fibrous is material and the paste material and forming into shapes such as cubes, rabbits, balls, shells, long shells, fins, filled cylinders, Christmas shapes, stars.
Figure 5B:
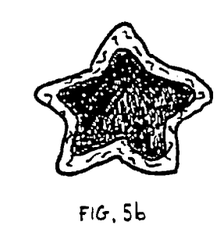
Figure 5C:
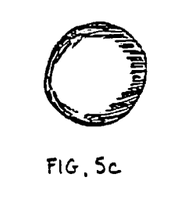
Figure 5D:
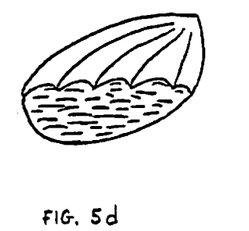
Figure 5E:
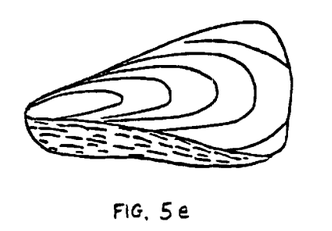
Figure 5F:
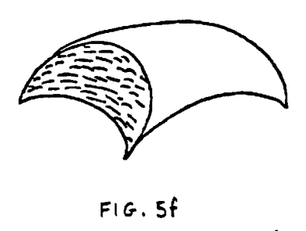
Figure 5G:
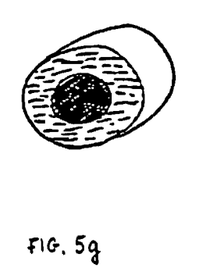
Figure 5H:
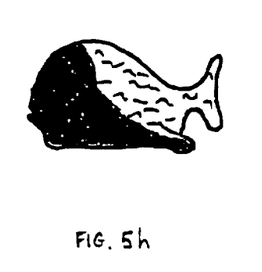
Figure 5I:
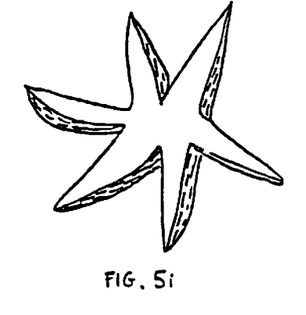

The installation for the manufacture of ultrafibres consists of a screw extruder 1 with two very similar interlocking screws which rotate in the same direction or in the opposite direction inside a barrel 2. In other embodiments not described here, the extruder has a single screw which can be conical in shape.

Such an extruder consists of a motor 3 which drives the rotation of the two screws, interlocked by means of a reduction gear if necessary. Rotation is powered at a rate of 25 to 100 kW for example.

These screws are preferably self-cleaning and the barrel 2 can be shifted manually or hydraulically along its longitudinal line to facilitate access to the screws.

The materials used to manufacture the barrel 2 and screws are obviously food grade materials.

A filling valve 4 is located towards the near end 5 of the barrel. This valve 4 is used to introduce raw materials to be processed into the screw extruder 1.

The barrel can also include openings for secondary supply along the line of the screws, for example for supply of water.

An extrusion die 7 is located at the far end 6 of the barrel 2. A cutting device 8, and where necessary recovery device, are placed at the outlet of the extrusion die.

According to established practices, the extrusion die 7 has a smaller diameter than the bore diameter of the barrel such that transferred materials are compressed.

In the case of continuous production, the installation, comprises a metering device to feed raw materials into the filling valve 4 at a predetermined flow rate;

Heating 8a and cooling devices are adjusted to regulate temperature inside the barrel 2 and extrusion die 7.

The structure of the barrel 2 and extrusion process are described below in more detail.

The term "mixture" is used to describe raw materials subjected to the steps in the process which take place after introduction of the materials, in other words the heating, mixing and melting steps.

The barrel 2 comprises 3 adjacent zones 9, 10, 11.

The first, zone 9, is a filling zone into which the raw materials to be extruded are introduced. The filling valve 4 for the mixture opens here.

The formula of the mixture consists of proteins from fish and/or other sea products: fish, fish meat, surimi, squid, octopus, crab, shrimps, mussels, etc. Whenever mentioned in the text, fish proteins therefore refers to fish proteins, proteins from fish and/or other sea products. The sensory characteristics (flavour, colour, texture, etc.) primarily result from the incorporation of these specific proteins from fish and/or other sea products.

According to one embodiment, these raw materials are in the form of a raw or cooked moist paste added through the filling valve. The constituents making up the final ultrafibre formula can be added at this stage and mixed well. The mixture is then added to the extruder and dosed by means of a pump, a valvelifter or any other similar method. In an interesting embodiments of the invention, a "closed", supply system is applied, in other words the extruder barrel is hermetically sealed in the filling zone with the pump acting as a filler.

According to another embodiment, these raw materials are in the form of a solid powder and are added through the filling valve, along with water. The water for the mixture is added in the filling zone either totally or partially, or can be added in the second zone 10.

Marine powders such as this are obtained after precipitation, concentration, filtration or ultrafiltration and/or separation on preparatory chromatography column then dried in hot air (funnel, spray drying, etc.), on a heated surface (drum, . . . ) or by freeze-drying.

The final extruded product can be similar to fish or crustacean muscle though not exclusively so. It can be an entirely novel form, texture, flavour and colour and not resemble any raw material in particular. It can therefore be produced in any type of shape.

These marine protein products can be in natural or modified forms (chemical or enzymatic methods), raw or cooked, slightly or extremely concentrated and stored in a refrigerated, frozen or dried state.

Most commonly, the proteins of such marine products are in a moist form, with 10 to 35% of dry extract, in the form of 5 to 10 kg frozen blocks.

A common form consists of fish or crustacean and surimi pulp.

Surimi results from washing minced fish fibres several times in soft-water followed by successive drying steps in order to remove soluble muscle protein constituents. Residual insoluble proteins are stabilised in the frozen state by addition of protective agents, usually saccharose, sorbitol and polyphosphates. In this case, fish surimi contains about 25% dry extract, 18% of which is proteins and 8% of which is a protective agent.

A fish or crustacean pulp ordinarily contains 15 to 20% of dry extract, 12–15% of which is proteins.

The second zone 10 is where mixing, or moisturisation where necessary, and heating to a core temperature of at least 130° C. take place. The mixture is transferred from one end to the other of the barrel 2 while being exposed to compression and shear forces, in addition to being heated, as will be described later on.

The third zone 11 is the melting zone, with the temperature of the material increased to over 130° C., generally between 140° C. and 200° C., and the pressure increased to between 0 and 50 bars, depending on the composition of the formula, especially moisture content. The third zone 11 is where thermo-mechanical treatment takes place and is sufficient to cause the majority of food constituents in this zone to melt; especially fish proteins or marine products which undergo a plasticization step. The plasticization step and its effects on the final product will be described in detail at a later point.

One embodiment of the barrel 2 will now be described in more detail. This involves the first 9, second 10 and third 11 zones. These zones include at least one unit.

Each barrel unit has a specific, preregulated temperature. Depending on the prescribed temperature, heating is more or less continuous and gradual. The temperature of each unit can be regulated during the course of the process, depending on the raw materials added and the products required at the outlet of the die.

The first zone 9 is comprised of a unit 12 in which the temperature is equal the ambient temperature.

According to one variation, the second zone 10 has three units 13 and the third zone 11 has three units 14.

The temperature of the units 13 in the second zone 10 is 90, 100, 140° C. respectively, from one end of the barrel 2 to the other.

The temperature in the units 14 in the third zone 11 is 165, 175, 175° C. respectively, from one end of the barrel 2 to the other.

According to a second variation, the second zone 10 has five units 13 providing gradual heating in five stages from one end of the barrel to the other. The third zone 11 has three units 14 as in the first variation of the embodiment.

According to a third variation, the second zone 10 only has two units 13 and heating is, as a result, less gradual than in the first and second variations. The melting zone 11 has only one unit 14.

In the same way as the barrel being comprised of several units each corresponding to a given temperature, the barrel screws also consist of several elements. Each of these elements has a given structure, from one end to the other. The length of each series of elements may or may not coincide with the length of a unit.

In one embodiment, the diameter D of screw elements is 55.3 mm and the length of each element is 50 or 100 mm. The total length L of screw elements mounted on a screw shaft is 1000 mm, in other words an L/D ratio of 18. This ratio varies as a function of the type of screw used. It ranges from 14, in the case of four 200-mm units in the barrel, as in the third embodiment, to 33 in the case of nine 200-mm units, as in the second embodiment. This ratio is, for example, 25 in the case of seven 200-mm units According to one embodiment, the barrel 2 of the extruder 1 consists of five 200-mm units, four of which are heated and/or cooled to achieve a precisely regulated temperature.

The elements of the single-thread screw are called V1F (pitch in mm). The elements of the double-thread screw are called V2F (pitch in mm). The elements of mixing screws are called MAL (angle in degrees) while the elements of negative-thread and net screws are called NEG (pitch in mm, number of threads×dimension in mm).

In a usual embodiment, the profile of the two screws is as follows:

200 mm filling zone: 200 mm V2F (50 mm);

400 mm mixing and heating zone: 100 mm V1F (50 mm)+50 mm MAL (60°)+100 mm VIF (33 mm)+100 mm V1F (25 mm)+50 mm NEG (−15 mm, 3×6 mm);

400 mm melting zone: 300 mm V2F (33 mm)+100 mm V2F (25 mm).

This is only one example of an embodiment of the invention. There are many more combinations of screw profiles that can be implemented using the same screw elements or other screw elements of a similar design.

In the case of this profile, in the 400 mm mixing and gradual heating zone, the screw has elements of mixing screws and elements of the VIF screw of decreasing thread size (50 then 33 then 25 mm), leading to gradual compression of treated materials.

A description of the die 7 is given below.

The die 7 typically consists of several die elements positioned, end to end and connected by means of adapted mechanical attachments. It is frequently made of metal, especially food grade stainless steel. Dies can be made from any heat-resistant material, notably special plastics and resins. Die size is adapted to provide gradual cooling of the melted and plasticized material, to a temperature of 100° C., if not less, for example to a temperature of 10° C., preferably between 80 and 30° C.

The internal surface of the die 7 has a controlled roughness during machining of the metal in order to exert shear forces on the product during the cooling process. The internal shape of the die is adapted to the final product required.

The combination of cooling and shear forces on the walls leads to continuous texturization of the cooled material in the form of fibres as described below.

The die is often designed to allow a linear flow rate of products at the outlet of the die in the order of 2 to 10 m/min., ideally 4–6 m/min.

The section shape can be round, oval, rectangular or variable (ludic shapes: star, cube, ring, people, animals, etc. . . . ).

In some cases, the shear forces on the walls and the length of the die can be sufficiently high to slow down extrusion of the product without the need for auxiliary cooling outside the die. In the majority of cases, the die 7 includes a cooling system for the outer surface, for example by circulation of cold water in a double sleeve (water between 60° C. and 0° C.). It is also possible to cool the die 7 by means of brine at negative temperature (−1° C. to −20° C.), for example 30% glycollated water.

The combination of cooling temperature in the die 7 and shear forces on the inner walls of the die 7 is closely related to the shape of the die, its length, constituent materials and machining as well as the flow rate of the melted material to be cooled.

According to a first embodiment, the die is a round die made of 316 L stainless steel with a 325 mm² flow section allowing 100 kg/hour of material to be textured over a length of 8 m (8 zones of 1 m each). Cooling is carried out using ice water at 1° C. circulating at a rate of 500 liters/hour. The moisture content of the extruded mixture is about 72%.

According to a second embodiment, the die is a rectangular die made of 316 L stainless steel with a 1200 mm² flow section allowing 350 kg/hour of material to be textured over a length of 6 m (6 zones of 1 m each). Cooling is carried out using: ice water at 20° C. circulating at a rate of 1000 liters/hour. The moisture content of the extruded mixture is about 62%.

According to a third embodiment, the die is a rectangular or oval with a thickness of 12 to 18 mm and a width of 40 to 80 mm. The melting and finishing temperature of the die promote non linear alignment of fish proteins or marine products that is non linear but is in the form of a V-shape. This arrangement of the material contributes to ultrafibres greatly resembling fish muscle rich in myotomes.

According to a fourth embodiment, the material transferred to the die is filled with a filling product added through the coextrusion valve opening into the die. The filling material can be produced by an extrusion process.

The die 7 consists of a first uncooled zone 15, which lengthens the far end of the melting zone 11, and at least a second zone 16 cooled by the device above. The temperature of the product discharged from the die is 30 to 80° C. depending on the desired rigidity.

In a first embodiment for example, the uncooled zone 15 has a length of 2 meters.

According to one mode of embodiment, the installation has a first adapter between the far end 6 of the melting zone 11 and the extrusion die 7.

This first adapter generally consists of one (or two) central perforation(s) through which the melted and plasticized material is extruded. If there are two perforations, these converge in a single outlet. If the extrusion die has a small diameter, the perforations are generally conical. The first adapter often has two lateral perforations into which probes for measuring melting temperature Tm and pressure P are inserted. The outlet of the first adapter can be round, oval, square, rectangular or with the exact internal shape of the extrusion die (this can be a ludic shape . . . ).

According to one embodiment, in addition to the first adapter, the extruder comprises a second adapter between the first adapter and the extrusion die.

This second adapter can have various internal shapes depending on the internal shape of the first adapter and extrusion die. It can incorporate a diffusion plate consisting of several dozen small perforations which divide the flow of melted and plasticized material.

In general, the total surface area of perforations in the diffusion plate is set up so as to create a restriction of 10 to 50% with respect to the flow section in the extrusion die.

According to one application, the extrusion pump is inserted between the first or second adapter and the die in order to allow steady flow into the die for improved stabilisation of flow. This is often a gear pump whose body can be reheated by electrical resistances in order to maintain the melted and plasticized mass at the required temperature.

Furthermore, several cooling dies can be arranged in parallel at the outlet of the screw barrel. In this case, a specific adapter placed in front of the dies ensures homogeneous distribution of the melted material in each die.

The impact of thermo-mechanical treatment in the extruder of products leaving the die will now be described.

Due to the high temperatures applied in the melting zone, the thermo-coagulable constituents of the mixture undergo plasticization. The term thermo-coagulable proteins refers to proteins such as fish and crustacean muscle, egg white, vegetable globulins from vegetables such as soya and wheat proteins as opposed to thinning proteins such as collagen or milk caseins.

The plasticization state is obtained at temperatures in the range of 130 to 180° C., generally around a temperature of 145–160° C. for moisture levels during extrusion in the range of 50 to 85%, generally between 60 and 80%, and fat levels in the dry product during the extrusion process in the range of 0 to 40%, generally between 2 and 20%.

In principle, shear forces lead to reheating by friction. Pressure in the extruder probably does not affect molecular interactions, particularly between proteins, but does allow high temperatures (140–200° C.) to be obtained without boiling or water vapour formation taking place. The effect of pressure combined with temperature probably facilitates air leaving the mixture.

The transition of thermo-coagulable proteins through this plasticization stage confers on the mixture transferred to the barrel an original viscosity, difficult to specify because the system is pressurised but probably in the order of 1000 to 500 000 centipoises, which gives it a specific texture during the cooling process in the die.

It is supposed that the texture of the mixture passes through a relatively liquid state (viscosity of 1000 to 10 000 centipoises) in the melting zone 11, a viscous state (viscosity of 100 000 to 500 000 centipoises) in the uncooled zone 15 of the die 7, an uncooled zone in which progressive alignment of the mixture into fibres probably takes place, and finally through a solid state in the cooled zone 16 of the die, a cooled zone in which fibres tending towards the solid state are finally formed.

During the plasticization process, proteins undergo a change in structure with a new structure emerging under the combined effect of the cooling and shear forces applied in the die.

The constituents of the mixture, especially proteins, rearrange in the form of an organised macroscopic and microscopic structure, consisting of superimposed layers of aligned or tangled fibres with multiple ramifications, and possibly even fibres arranged in the form of V-shapes.

Figure 1:
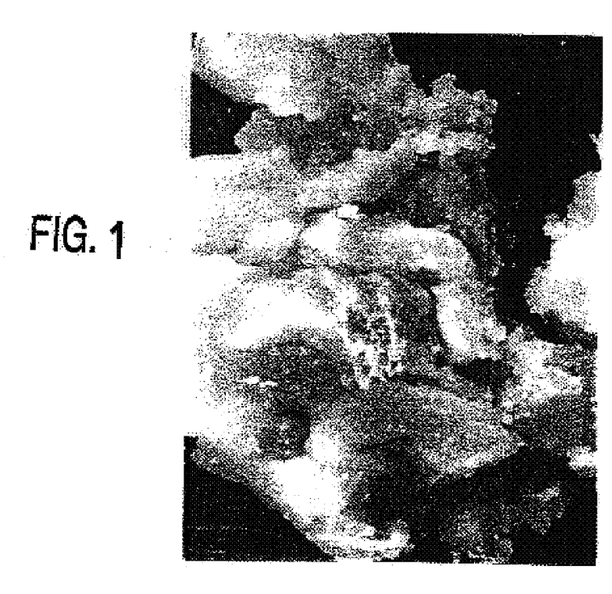
FIG. 1 shows a product obtained by mixing a paste material and a fibrous material of the ultrafibre type obtained by extrusion cooking according to a first embodiment.
Figure 2:
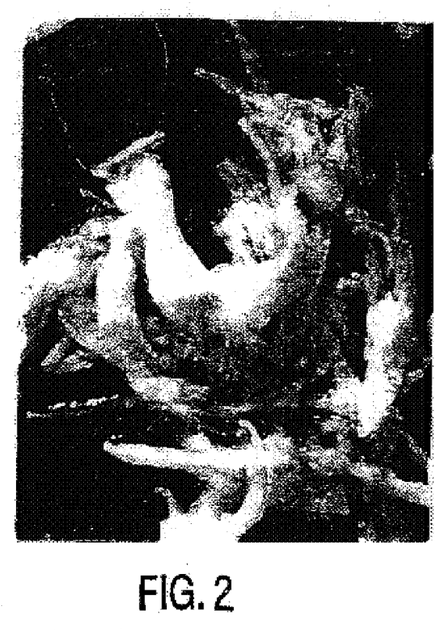
FIG. 2 shows ultrafibres obtained by extrusion cooking according to a first embodiment, after mincing the fibrous material leaving the extrusion die, with ultrafibres intended for mixing with the paste material.

The products 17 obtained by means of the above-described process will now be outlined.

On being discharged from the die 7, the product obtained 17 prior to any further treatment being carried out, for example cutting or chopping, is in the form of a roll 18, for example cylindrical with a diameter similar to the diameter of the die in the case of a die with a circular section, produced continuously if a continuous process is used.

This roll 18 contains a set of fibres which can be separated, for example manually, into bundles of fibres or even into individual fibres.

Figures 6, 6A, 6B, 6C, 6D:
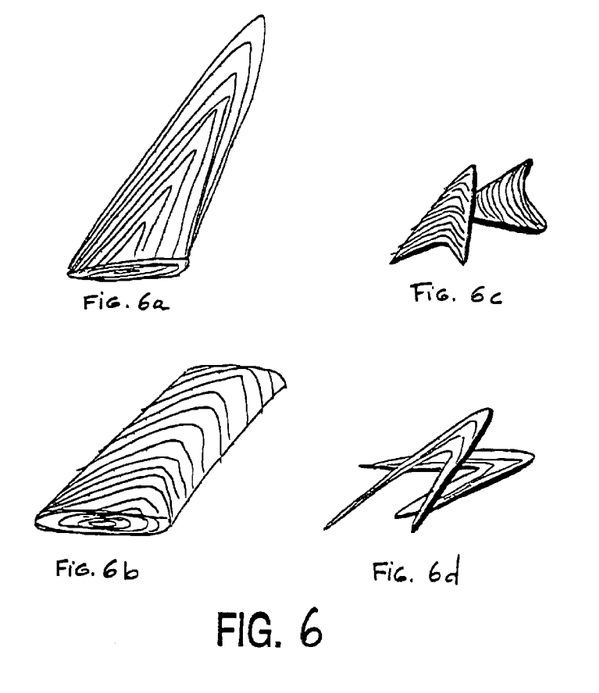

Fibres typically have a diameter that depends on the raw materials used and the operating conditions within the barrel and extruder die. Bundles of extruded fibres can have a V-shaped structure, similar to that of fish meat.

Before treatment such as grinding, fibres can be quite long, in the range of several centimeters, for example 4 to 5 centimeters. However, 30-cm long individual fibres have already been produced using this invention.

Figure 3:
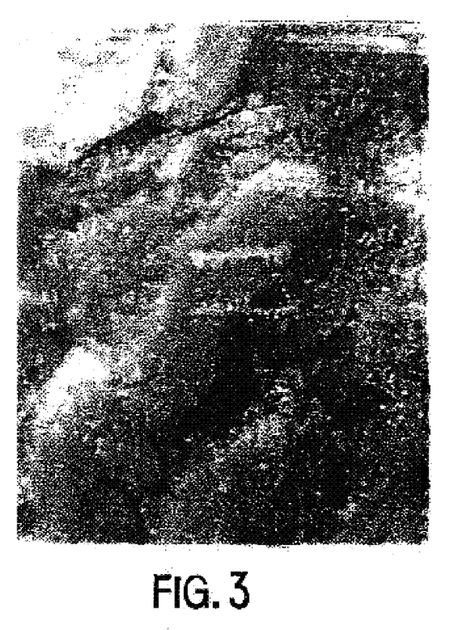
FIG. 3 presents a magnified view of the product in diagram 1, illustrating the centre of a bundle of ultrafibres embedded in the paste material.
Figure 7:
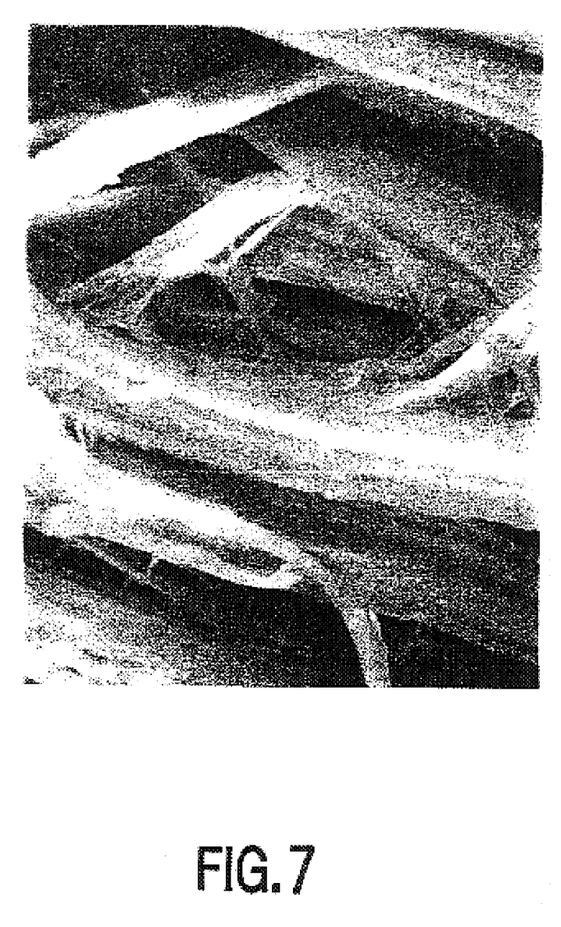
FIG. 7 is a magnified view of a bundle of entangled ultrafibres.

Under high magnification, for example×50, of the product 17 shows that the fibre structure visible in the product at the macroscopic level is also found at the microscopic level. This structure is similar to a fractal, self-repeating structure, in other words fibre ramifications appear to be infinite, in the same way as a hydrographic network. Ramifications continue towards the infinitely small: the same ramified structure is perceived at each level of magnification. This extremely fine fibre structure is also similar to that of the striated skeletal muscle of mammals and fish, consisting of a cascade of filaments, microfilaments and fibrils. They are called "ultrafibres" because of their extremely fine structure.

At present, the largest fibres are at least 5 to 20 cm long with a diameter of 0.5 to 2 mm, if not in the order of cm for dies with a diameter of 20 to 30 cm.

Associated fibres can be very small, to just within the limits of visual perception, in other words 1 to 2 mm long with a diameter of 0.02 to 0.1 mm.

It is assumed that this fibre network continues down to the molecular level.

The man skilled in the art is aware that human sensory perception is such that sizes in the order of 10 $\mu$m are detected in the mouth.

Depending on the composition of the initial mixture placed in the extruder and the operating conditions of the extruder, particularly temperature and pressure conditions, a large range of aligned textures is obtained. For example, imperfect macroscopic alignment in a V-shape can be obtained under certain formulation and cooling conditions in the die. This V-shape structure is only visible at the macroscopic scale in this case, with a length ranging from 0.5 to 20 cm. The microscopic arrangement is similar to that of the previously mentioned ultrafibres, that is aligned or entangled. These. V-shapes are in fact the result of the temperature and speed profile of the finished product in the die at the moment when solidification of protein materials takes place. They can be divided into individual components either manually or using an adapted mechanical process at the outlet of the die.

This fibre structure leads to rheological and organoleptic properties specific to the product and its derivatives, difficult to characterise instrumentally. As an example, the relaxation coefficient of a cylindrical sample of fibres with a diameter of 32 mm and thickness of 25 mm obtained by 15% compression/relaxation of the sample for 5 minutes: on an Instron apparatus equipped with a 75 mm flat probe is between 60 and 90%, in other words-similar to that of synthetic viscoelastic type compounds (100% for rubber).

Examples of the mixture compositions leading to the production of ultrafibres are given below.

EXAMPLE 1 fish meat 93%,
powdered egg white 5%,
corn starch 1%,
salt 1%,
for 78% moisture.

EXAMPLE 2 crab meat 5%,
fish meat 45%,
water 29%,
whey proteins 8%,
other milk proteins 3%,
starch 5%,
fats 4%,
salt 1%.

The firmness of the sample depends mainly on its water content; not the case for elasticity.

Diagrams 1 and 3 illustrate the extruded product with an aligned or V-shaped fibrous structure. Diagram 6 shows the direction of the V-shape structure which is sometimes sought after.

The product leaving the die is processed to give ultrafibres incorporated into the foodstuff: cooling, slicing, grinding, separation.

Before being mixed with the paste material, ultrafibres may be mixed with a food paste such as fish meat, pulp, oil or other fats. Ultrafibres can be packaged in sealed bags and in this way constitute a semi-finished industrial product.

These ultrafibres can be dried, frozen, sterilised or can undergo any other physical preserving treatment, further supporting their use as semi-finished industrial products.

A second embodiment of the invention will now be described whereby thin, cooked fibres with a diameter in excess of about 0.1 mm by size reduction.

The process for production of fine fibres consists of the following steps: constitution of the initial mixture, forming, cooking, cooling, cutting, grating.

According to one variation, fine fibres are obtained from a fish paste consisting of: 80% fish meat, 7% starch, 7% water, 3% salt and 3% flavouring. This paste is moulded at a temperature in the range of 1 to 4° C. in sealed bags which give it a particular shape, such as a 50 to 80 cm long tube with a diameter of 10 to 15 cm, shrink-wrap bag, punnet or plastic mould.

The paste is cooked in its sealed packaging at a temperature of 80 to 95° C. for 1 to 1.5 hours then stored at −20° C. until used. The product is then soaked at a temperature between 0 and −10° C. before undergoing size reduction resulting in fibres with a diameter of under 1 mm and 0.5 to 5 cm in length.

According to another variation, fine fibres are obtained from a fish paste consisting of, for example: 60% fish meat, 19% water, 10% vegetable fat, 1.5% salt, 1% flavouring, 7% starch and 1.5% gelling agent. This paste is extruded as a thick strip, 5–20 mm, then cooked at 80–90° C. for 10 to 20 minutes. The strip is then cooled down continuously until a core temperature of −5° C. is obtained. It is then cut into 5–15 cm cubes then undergoes size reduction leading to the production of fine fibres with a diameter of less than 1 mm and a length of 0.5 to 5 cm.

A third method for the production of fibres will now be described in which the fibres mixed with the paste material are cooked or raw natural fibres such as natural flakes of fish meat, crab or other marine products, obtained by mechanical separation of myotomes. The fibres or are more or less separated and vary in length.

The raw material used to obtained these fibres is usually chosen from the following categories:
  fish fillets or chunks or scraps of fillets or remnants
  oily or lean fish
  white fish (hoki, pollack, coley, whiting, hake, . . . salmon, trout, tuna, mackerel)
  fresh or frozen fish—plain or smoked.

The raw material can be mixed with salt, colouring, texture stabilisers (polyphosphates, starches, gelling agents . . . ). Fillets are generally cooked, preferably in vacuum packed plastic bags as cooking leads to better separation of myotomes. All types of cooking treatment can be applied such as high pressure cooking. In one embodiment, cooking is carried out in an autoclave under backpressure of 0.5 bar for 1 hour at 80° C. (recommended temperature).

Myotomes then undergo mechanical separation treatment, for example:
- introduction of 80 kg in a horizontal cylinder, 1.2 m in length with a diameter of 70 cm to 1 m for example, equipped with a blade and comb. The length and arrangement of teeth on the comb define the resulting fibre quality.
- rotation of the cylinder at 10 to 15 rpm opposite to comb (800 to 1200 rpm) for a variable length of time depending on fish species and fibre quality sought after: between 1 and 3 minutes.

The process and installation for mixing fibrous material containing the above-described fibres with a fish based paste material according and a fish based paste material, according to a first, second and third embodiment, will now be described. The multitexture effect is obtained by mixing together the textured paste material and fibres.

In this text, the terms "paste material" and "food matrix" are used interchangeably. The paste material obtained after mixing is actually a matrix or bound mixture separate fibres and/or masses distributed in a primarily random manner. In a finished product such as that illustrated in diagram 5, the overall texture is both firm in terms of its crunchiness and soft in terms of it malleability and tenderness.

The products obtained provide a richness in terms of sensory perception that is not known to the author at the present time. This sensation, directly linked to the heterogeneous texture, is conferred by a soft fraction that is easily dispersed in the mouth and which releases firm and elastic fibres which become more and more noticeable in the course of chewing. For example, manual tearing shows up these fibres in the products represented in diagram 5.

The multitexture or heterogeneous texture is obtained mainly through what is known as a texturization step. Without this texturization, the fibres incorporated into the food matrix would not be as distinctly perceived in the mouth. Nevertheless, even without this texturization, it is possible to obtain a mixture of paste and fibrous materials. The product then contains a matrix, less soft than if texturization is carried out, and ultrafibres whose extreme fineness is less well perceived in the mouth.

The food matrix is usually raw before being mixed with the fibres but can be cooked if its composition, in particular it fat content, allows mixing to be carried out. Texturization is usually carried out using techniques such as homogenisation, emulsification and/or expansion and/or cutting. The food matrix is usually textured in the raw state.

According to one embodiment, texturization is carried out on the paste material, prior to being mixed with the fibres. The paste material can be obtained from a fish paste comprised of: between 30 and 60% fish meat, between 25 and 40% water, between 5 and 15% thickening agents such as starch. Gelling agents can also be added to these main ingredients, such as carragheen, xanthane, gelatin or guar gum.

The density of the paste is then reduced by adding either one part air per part fish paste or 0.5 part air per part fish paste. The amount of air can range from 0.5 to 1 which gives rise to different textures (more or less aerated). Careful mixing of air and fish paste makes it possible to produce a new paste texture that is soft, light, elastic and tender.

The quality of the mixture depends on the parameters of air incorporation, in other words pressure and backpressure in the mixing head, dimensions and speed of the mixing head. In practice, the pressure regulator in the mixing head is positioned between 3 and 5,5 bars which automatically sets the pressure of the corresponding head: inlet pressure should be 5 to 6 bars. Head speed is set between 25 and 50 Hz.

According to another embodiment, texturization is applied to the food matrix and fibre mixture. The mixture obtained is aerated with 0.3 part to 1 part air per 1 part mixture keeping in mind that the mixture itself can contain air. In spite of undergoing mechanical treatment, the fibres retain all their original properties.

The paste material can be mixed with fine fibres and/or ultrafibres and/or natural fibres. The paste material and the fibrous material are partly of marine origin.

For example, 0.85 to 0.4 part in weight of paste material described above is mixed with 0.05 to 0.5 part in weight of fine fibres and 0.05 to 0.6 part in weight of ultrafibres.

A 5% level of incorporation of fibres gives the paste material a "framework" and prevents the forms obtained from the fibrous material/paste material from changing and disintegrating. The best effect is obtained with a 60% level of incorporation of fibres.

Texturization takes place within a temperature range of 0 to 20° C.

The fibres can be added as such or in the form of a fibre-based preparation. The fibre-based preparation can consist of, for example, 75% fibres and 25% fish meat or, for example, 70% fibres 25% fish meat and 5% vegetable fat.

The starting formula described above can also contain specific ingredients which confer on the paste material resistance to deformation during moulding/mould removal processes, as described below. For example, pregelatinised starch, vegetable fats with a high melting point, carragheen, alginates and various flours can be used.

The process and installation for forming products with a heterogeneous structure will now be described, for example as shown in diagram 5, after mixing the fibrous material and the paste material.

Product forming can take place within a temperature range of 0 to 20° C. by:
- extrusion of the food matrix and fibres at a temperature between 0 and 5° C., the extrusion die having various shapes (nozzle, screw . . . ) depending on the desired product shape;
- coextrusion of the food matrix and fibre mixture, one the one hand, and of another food preparation (such as sauces, vegetables, fish or meat based preparation) on the other hand, allowing a range of shapes to be produced:cases, stars, other ludic shapes, crescent shapes . . . , coextrusion taking place at temperatures of around 0 to 5° C.;
- moulding in flexible moulds at a temperature of 1 to 6° C.;
- mechanical moulding in a moulding device, using a packing system based on density and ejection of the shapes obtained by expulsion by means of either air or an air/liquid mixture which assists removal (water, oil . . . ) through the pores of the mould.

Colouring can be added to the product before or after stabilisation of product shapes by
- depositing colouring on the product by extrusion, through a die with a specific form depending on the colour required, of the colouring at a temperature of about −1 to 5° C.;
- depositing colouring on the product using a strip of material or a brush dipped in the colouring; colouring is deposited by contact of the brush or piece of material with the surface to be coloured;

projecting colouring onto the product by a process using rotary discs: a pump supplies discs rotating at high speed (1500 to 3000 Hz) with a large amount of colouring; the centrifugal force produced in this way projects the colouring onto the edges of the discs and disperses it in the form of fine particles whose diameter decreases in size the higher the speed of rotation;

low pressure microspraying of the colouring by means of nozzles equipped with an air inlet which scatter the colouring into microdrops.

The colour is fixed by:

placing in the oven for 2 to 3 minutes at 85–90° C.;

placing under burners at 800–900° C. for less than 1 minute. For example, exposure to a 1 KW IR lamp for 15 to 20 seconds will fix the product.

Stabilisation of the product shape can be carried out by:

cold gelling, for example by adding 1 to 5% of alginates to the initial fish paste and spraying the form obtained with a 1 to 3% calcium chloride solution;

cooking in moulds in a steam oven for 10 to 20 minutes at 80–90° C.;

cooking in a water bath for 2 to 5 minutes at 95° C.;

cooking in a continuous steam oven, for example for 3 minutes at 85° C.

A few examples of application of the products obtained from the paste material and fibrous material mixture are described below.

Example 1: small ludic shapes obtained after moulding and cooking a paste consisting of 40% of an ultrafibre-based preparation (comprised of 70% of ultrafibres for example), 44% fish meat, 6% water, 5% starch, 3% vegetable fats, 1.5% salt, 0.5% flavouring. These small shapes can weigh less than 20 g.

Example 2: small ludic shapes obtained after coextrusion and cooking of a paste consisting of 40% of an ultrafibre-based preparation (comprised of 80% of ultrafibres for example), 44% fish meat, 6% water, 5% starch, 3% vegetable fats, 1.5% salt, 0.5% flavouring, and a hollandaise or provencale type sauce as a filling.

Example 3: plain ultrafibre fish steaks obtained after shaping in a steak-former and cooking a paste consisting of 50% ultrafibres on a support (support: 75% ultrafibres, 25% fish meat for example), 40% fish meat, 1% salt, 5% water, 1% flavouring, 3% starch.

Example 4: fibrous fish steaks with fines herbes, mixed herbs, pepper, chilli, shallots . . . obtained by adding 0.5% of a mixture of spices and/or seasoning to the preparation.

Example 5: fish and vegetable based cakes obtained from 30% vegetables, 21% fibres, 22.5% fish meat, 6% starch, 0.5% flavouring, 1% salt, 15% water, 2% vegetable fats, 2% binders, according to the following steps:

mixing vegetables with the fibrous and textured matrix in a blender for 5 minutes;

shaping in a steak-mould;

cooking in the oven for 15 minutes at 90° C.

Example 6: filled rods obtained by coextrusion cooking:

a paste consisting of, for example, 46% fish meat, 37% water, 12% starch, 3% salt, 2% flavouring making up the filling;

a paste consisting of 30% fibres, 45% fish meat, 15% water, 5% starch, 3% vegetable fats, 1.5% salt, 0.5% flavouring making up the case.

Example 7: quiches and pies: shortcrust pastry garnished with a mixture of fibres+paste material, 5% fresh cream, 2% milk, 2% flour, 1% salt.

Example 8: thin fibrous slices composed of a food matrix obtained from fibres (30%) and a fish paste (70%), comprised of 42% fish meat, 35% water, 3% vegetable fats, 1.5% salt, 1.5% flavouring, 11% starch, 6% egg white. Slices are ovoid in shape, 3 mm thick with a diameter of 10 cm.

Example 9: fibrous rod filled with cheese obtained from a paste mixture consisting of 30% fibres, 45% fish meat, 15% water, 5% starch, 3% vegetable fats, 1.5% salt, 0.5% flavouring and melted cheese as the filling. The product is gelled by heating at 90° C. for 15 minutes.

Example 10: fish rilletes obtained by mixing 30% of a textured food matrix, 25% support fibres, 15% water, 15% vegetable fats, 3% dairy fats, 3% salt, 3% starch, 2% milk proteins, 2% thickener (consisting of guar gum and xanthane), 2% flavouring.

Example 11: fish paste spread consisting of 50% of a mixture of fibres+textured paste material (in a 40–60 proportion), 20% water, 14% dairy fats, 10% starch, 2% skimmed milk powder, 3% salt, 1% flavouring.

Example 12: fish pâté consisting of 43% vegetable fats, 50% of a mixture of fibres+textured paste material (in, a 50—50 proportion), 2% salt, 3% thickener, 2% flavouring.

Example 13: fibrous fish pâté consisting of 30% of a mixture of fibres+textured paste material (in a 30–70 proportion), 25% water, 15% egg, 15% vegetable oil, 10% potato starch, 2% guar gum, 2% salt, 1% flavouring.

What is claimed is:

1. A fish based food product comprising a texturized aerated fish paste material and an extrusion-cooked fibrous fish material, the fibrous material including individual fibres or bundles of fibres, each fibre having a diameter in a range of 1 μm to 1 mm, the product presenting a heterogeneous texture and a firm and elastic overall consistency similar to that of fish or crustacean muscle tissue, wherein the fibrous material forms a network of macroscopic fibres whose diameters the on an order of 0.1 mm to 1 mm, and forms a structure with microscopic fibres each having a diameter on the order of 1 μm to 0.1 mm, and wherein at least some of the fibres have a ramified network configuration.

2. Product according to claim 1 wherein the product contains over 30% of fish meat and 25 to 40% water.

3. Product according to claim 2 wherein the product is 1 to 12 cm in length and weighs between 3 and 300 g.

4. Fish based food product according to claim 1, the paste material consisting of over 30% of fish meat, wherein the product is in the form of fish steaks, fish and vegetable based cakes, filled bars, quiches, pies, thin slices, spreads, fish fillettes, fish pâté, or small ludio shapes.

5. Process for the production of a fish base food product with a heterogeneous texture according to claim 1 wherein the process is comprised of the following steps:

manufacturing a fibrous material and paste material;

mixing the fibrous material with the paste material; and moulding the mixture to form shapes.

6. Process according to claim 5 wherein the fish paste material is textured using homogenization, emulsification, and/or expansion and/or cutting before mixing with the fibrous material, in order to obtain a gelling strength on the order of 50 to 150 g/cm², or after mixing with the fibrous material by adding between 0.3 and 1 part air per mixture part.

7. Process according to claim 6 wherein the fibrous material consists of small fibres obtained from a fish based preparation, the small fibres being manufactured according to the following steps:

mixing ingredients of the fish based preparation;

forming the fish based preparation;

moulding and then cooking the fish based preparation to allow gelling to take place;

cooling; and size reducing the cooled fish based preparation.

8. Process according to claim 7 wherein in the fish based preparation used in the manufacture of the small fibres consists of over 50% washed and refined fish meat suitable for gelling, to which cryoprotectant type stabilising agents are added for freezing purposes, the fish based preparation having a moisture content below 80% and having a gel strength of 150 to 300 g/cm$^2$.

9. Process according to claim 6 wherein the fibrous material contains cooked or raw natural fibres from crab or other marine products obtained by mechanical separation treatment.

10. Process according to claim 6 wherein the paste material contains over 30% washed and refined fish meat suitable for gelling, to which cryoprotectant type stabilising agents are added for freezing purposes, and has a moisture content below 80%, and wherein the process further includes enriching the paste material with gelling or thickening agents so as to obtain a gel strength of 100 to 250 g/cm prior to texturization.

11. Process according to claim 6 wherein the level of incorporation of the fibrous material in the paste material is between 5 and 60% by weight, depending on the desired final texture.

12. Process according to claim 6 wherein mixing takes place at a temperature in the range of −10° C. and +20° C.

13. Process according to claim 6 wherein the fibrous material mixed with the paste material consists of at least one type of fibre chosen from ramified network fibres, fine fibres and natural fibres.

14. Process according to claim 6 wherein the fibrous material is incorporated according to a statistical method in a blender or mixing tank.

15. Process according to claim 6 wherein the mixture obtained by mixing the fibrous material and paste material undergoes the following steps:
    forming by extrusion or moulding into two- or three-dimensional shapes or into a strip;
    cooking, leading to gelling and stabilisation of the product; and
    cooling.

16. Process according to claim 15 wherein the mixture undergoes the further step of adding surface colour to the extruded or molded shapes, the colour being added before and/or after the cooking step by spraying, depositing colour on the strip or extrusion of a coloured paste material.

17. Process according to claim 15 wherein the cooking step consists of a combination of a microwave cooking step and a steam cooking step, the microwave cooking providing rapid cooking to the core of the product so as to produce a sufficiently stable gel-like structure that is stable before cooling while the steam cooking results in the surface of the product being cooked without drying it out, with the microwave cooking being carded out before or simultaneously with the steam cooking.

18. Process according to claim 5 wherein the fibrous material consists of a ramified network of fibres obtained from minced fish meat by means of a high-temperature and high-moisture extrusion cooking process comprised of the following steps;
    a. introducing fish meat into a single screw extruder;
    b. transferring fish meat from one end to another and of an extruder barrel, adjusting screw configuration and temperature within the barrel such that raw material of the fish meat successively undergoes a mixing and heating step up to a temperature of about 130° C., followed by a melting step with an increase in temperature of the material to above 130° C., and an increase in pressure to between 0 and 50 bars, such that plasticization of the transferred fish meat takes place; and
    c. extruding, at the other end of the barrel, the transferred fish meat, obtained after plasticization, through a die adapted for texturization, and shaping and cooling the extruded fish meat such that a fish based food product with a ramified fibrous structure is obtained.

19. Process according to claim 18 wherein the extruded fibrous material is cooled in the die to a temperature of 100° C., and the process comprises an initial cooling phase in an uncooled zone in the die at the other end of the barrel, followed by a second cooling phase in a cooled zone at an outlet of the die.

20. Process according to claim 18 wherein the extrude fibrous material obtained from the die outlet is cooled in a cold shower, sliced to a desired length, then ground, with bundles of extruded fibres being cut and processed by at least one of shredding, mincing, lamination, blending, homogenisation separation such that the extruded fibrous material can be dispersed in a fish based matrix.

21. Process according to claim 18 wherein the extruded fibrous material contains 15 to 50% of dry matter, the dry matter consisting of at least 35% of total proteins.

22. Process according to claim 21 wherein 25 to 100% of dry matter in the extruded fibrous material consists of dry matter originating from fish and/or other marine products, and the dry matter comprises marine proteins in the form of minces, fillets, pulps, or surimi extracts.

23. Process according to claim 22 wherein the dry matter in the extruded fibrous material contains functional milk proteins, the functional milk proteins being in a dried or concentrated form.

24. Process according to claim 22 wherein the extruded fibrous material also contains at least one of egg proteins in liquid or powder form, vegetable or dairy fats, concentrated or isolated vegetable proteins, vegetable flour, starches and other complex carbohydrates, food grade hydrocolloids, spices, flavouring and colouring.

25. Process according to claim 18 wherein the extruded fibrous material is used in fresh form or preserved by physical treatment.

26. Process according to claim 18 further comprising melting the textured paste material which is regulated as a function of the level of fats in the paste material, the paste material having a fat level between 0 and 50%.

27. A fish based food product comprising a texturized aerated paste material and a fibrous material, the fibrous material including individual fibres or bundles of fibres, with each fibre having a diameter in a range of 1 $\mu$m to 1 mm, the product presenting a heterogeneous texture and a firm and elastic overall consistency similar to that of fish or crustacean muscle tissue, at least some of the fibres being obtained by size reduction of a fish based preparation or originating from natural fibres of marine products resulting from mechanical separation of myotomes, wherein at least some of the fibres have a ramified network configuration.

28. A fish based food product comprising:
    a fish paste including added air; and
    an extruded fibrous material including individual fibres or bundles of fibres, each fibre having a cross sectional width in a range of 1 $\mu$m to 1 mm, the fibrous material having a network of macroscopic fibres whose cross sectional widths are each between about 0.1 mm and 1 mm, the fibrous material further having a structure with microscopic fibres whose cross sectional widths are each between about 1 $\mu$m to 0.1 mm, at least some of which have a ramified network configuration; and
    wherein
    the product has a substantially heterogeneous texture.

29. A fish based food product comprising:
    a. fish paste; and
    b. a fibrous material including individual fibres or bundles of fibres of differing size wherein at least some of the fibers have a repeating, ramified network configuration the fibrous material being mixed with the paste; and
    wherein the product has a substantially heterogeneous texture and a formed final shape.

30. The product of claim 29 wherein the paste comprises fish material and air.

31. The product of claim 29 wherein the fibers are extrusion-separated and the pasted is extrusion-heated.

32. The product of claim 29 wherein the paste is texturized.

33. The product of claim 29 wherein at least some of the fibres have a diameter between about 1 µm to 0.1 mm.

* * * * *